INVENTOR
PHILIP N. BRAUN
BY Bodell & Thompson
ATTORNEYS

June 5, 1956 P. N. BRAUN 2,748,676

TAPE FEEDING, PRINTING, AND TAG ATTACHING AND SEVERING MACHINE

Filed Aug. 3, 1950 8 Sheets-Sheet 2

INVENTOR

PHILIP N. BRAUN

BY Bodell & Thompson

ATTORNEYS

June 5, 1956 P. N. BRAUN 2,748,676

TAPE FEEDING, PRINTING, AND TAG ATTACHING AND SEVERING MACHINE

Filed Aug. 3, 1950 8 Sheets-Sheet 3

INVENTOR.
Philip N. Braun
BY Bodell & Thompson
ATTORNEYS

June 5, 1956 P. N. BRAUN 2,748,676

TAPE FEEDING, PRINTING, AND TAG ATTACHING AND SEVERING MACHINE

Filed Aug. 3, 1950 8 Sheets-Sheet 4

INVENTOR.
Philip N. Braun
BY Bodell & Thompson
ATTORNEYS

INVENTOR.
Philip N. Braun
BY
Bodell & Thompson
ATTORNEYS

June 5, 1956
P. N. BRAUN
2,748,676
TAPE FEEDING, PRINTING, AND TAG ATTACHING AND SEVERING MACHINE
Filed Aug. 3, 1950
8 Sheets-Sheet 6

INVENTOR.
Philip N. Braun
BY Bodell & Thompson
ATTORNEYS

INVENTOR.
Philip N. Braun
BY Bodell & Thompson
ATTORNEYS

INVENTOR.
Philip N. Braun
BY Bodell & Thompson
ATTORNEYS 2,748,676

TAPE FEEDING, PRINTING, AND TAG ATTACHING AND SEVERING MACHINE

Philip N. Braun, Syracuse, N. Y.

Application August 3, 1950, Serial No. 177,448

8 Claims. (Cl. 93—88)

This invention relates to machines for applying identifying tags to articles to be laundered or dry cleaned, and has for its object a compact arrangement of the mechanisms by which the tags are successively printed on a tape with the identifying character and in addition applied or attached to the articles and severed from the tape during each cycle of operation of the machine.

It also has for its object a simple, compact actuating and timing mechanism for tape feeding, printing, stapling and severing mechanisms.

It further has for its object an arrangement and operation of the stapling mechanism and tag severing mechanism.

The invention consists in the novel features and in the combinations and constructions hereinafter set forth and claimed.

In describing this invention, reference is had to the accompanying drawings in which like characters designate corresponding parts in all the views.

The machine comprises generally a frame, tape feeding, printing and tag severing mechanisms, and actuating and timing mechanism carried by the frame. The printing mechanism comprises a movable member as a platen over which the tape feeds. The stapling mechanism includes a movable body for holding a supply of staples and feeding them one by one to an outlet opening into stapling position, and an anvil to receive the printed ends of the tape from printing position and also the work to which the printed tag is to be stapled, and the severing mechanism including a movable knife movable between the printing mechanism and the stapling mechanism.

The timer mechanism comprises a timer shaft operable by the actuating mechanism through a cycle of movement during each operation of the machine, the timer shaft controlling the operations of printing and tape feeding mechanisms successively, and the stapling and severing mechanisms successive to the printing and tape feeding.

As shown, the actuating and timing mechanism comprises a master motor which is a rotary motor, a second motor as an electro-magnet, or a solenoid having a single impulse, a reciprocating driven member or core actuating the platen of the printing mechanism, and a third single impulse motor, as a solenoid, for shifting the stapling mechanism against the work and shifting the stapling ejector to effect the stapling operation, and also operating a knife during the operation of the stapling mechanism to sever the printed tag from the tape.

Figures 1, 1A:
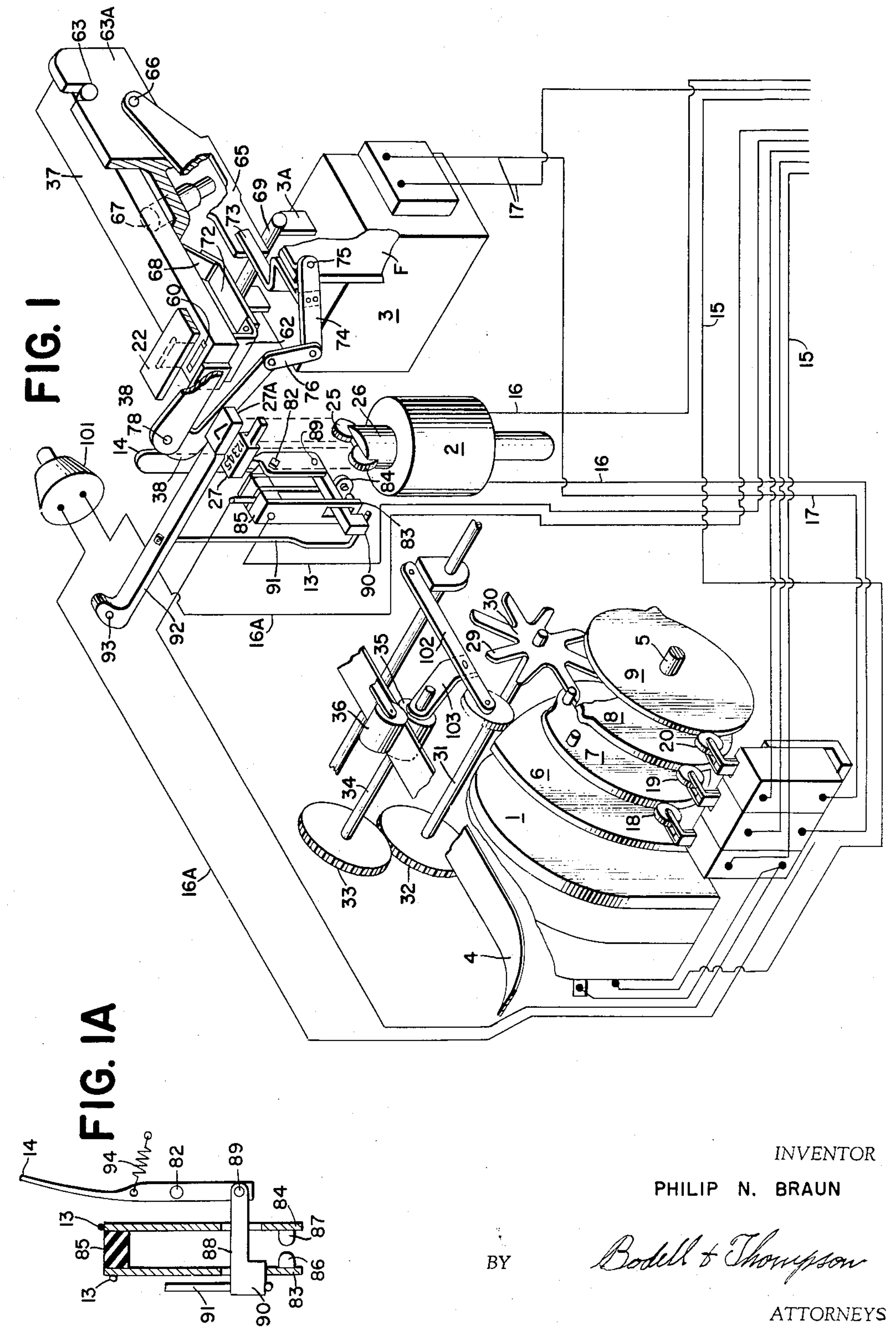
Figure 1 is a schematic view of this machine.
Figure 1A is a fragmentary detail view of the starting circuit switch shown in Figure 1.
Figure 2:
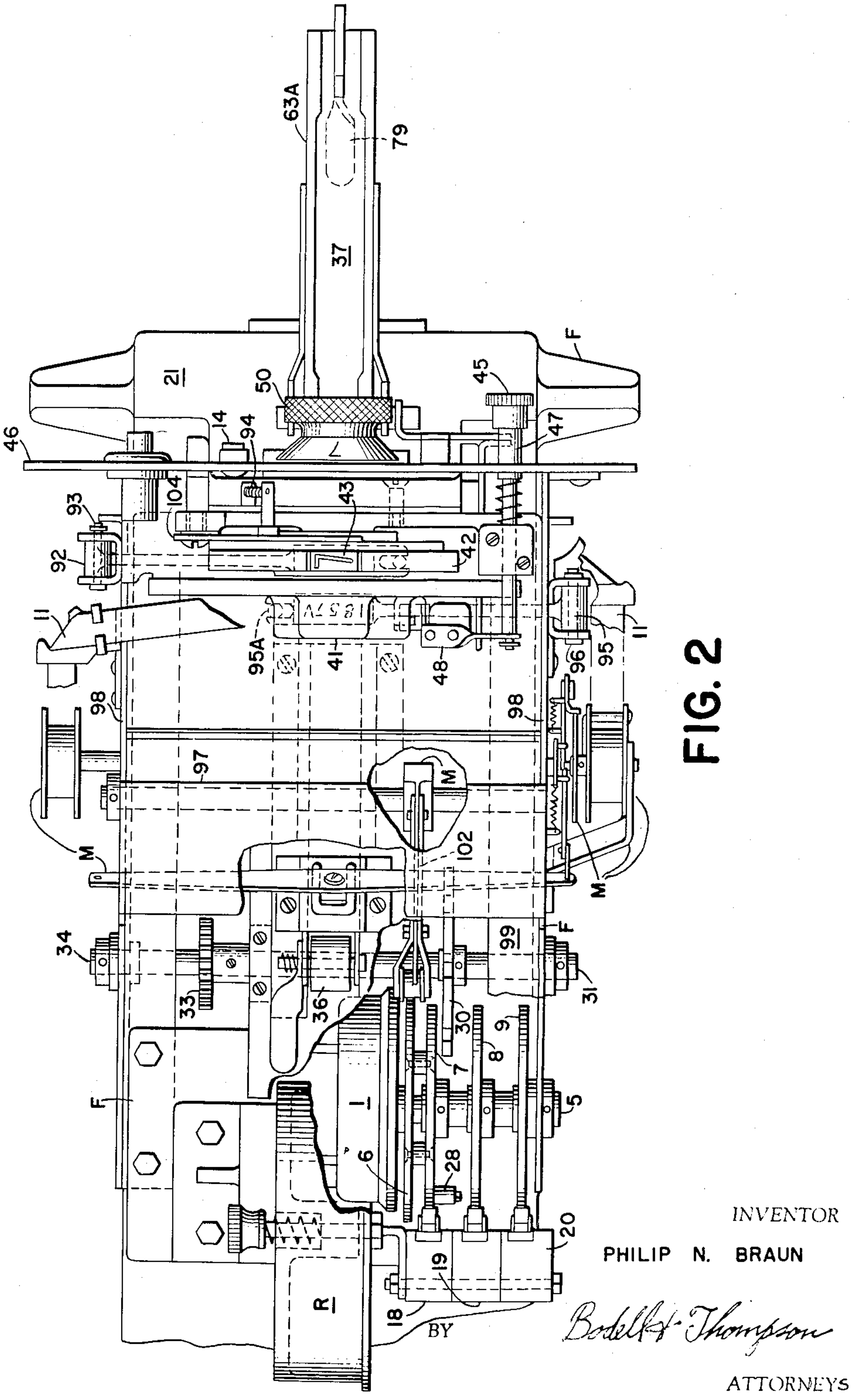
Figure 2 is a plan view.
Figure 4:
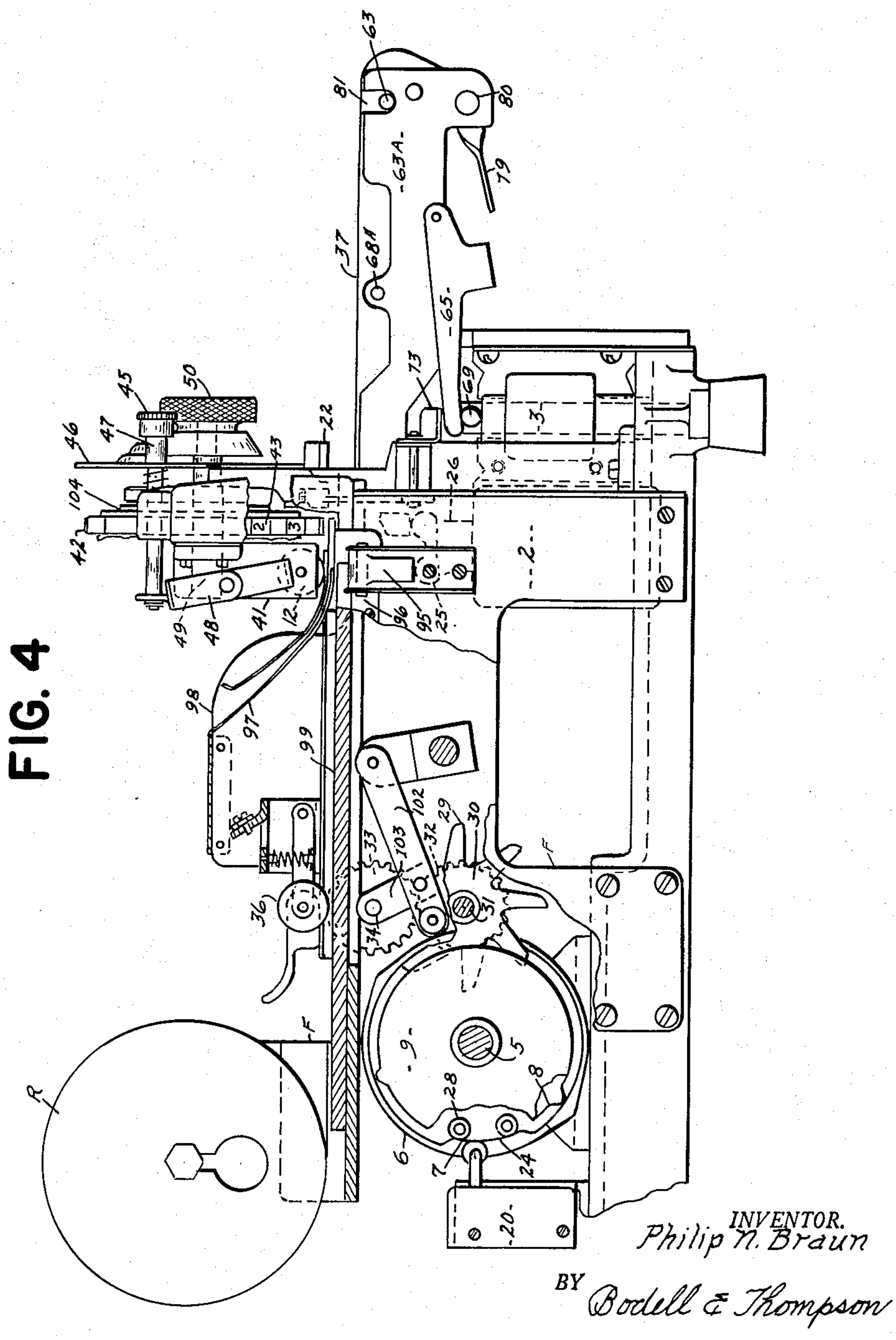
Figure 4 is a fragmentary side elevation, looking to the left in Figure 1, showing the relative arrangement of the printing and tape feeding, and the tag attaching and severing mechanism.

As best seen in Figure 1, the numeral 1 designates the master motor, 2 the second motor or solenoid for operating the printing mechanism, and 3 the third motor or solenoid for operating the stapling and severing mechanisms. 4 designates the tape which unwinds from a suitable roll R, Figures 2 and 4, supported on the frame F of the machine. 5 designates a control or timer shaft, here shown as a cam shaft actuated by the shaft of the master motor, the control shaft having a series of cams 6, 7, 8 and 9. The cam 6 operates feeding and reversing mechanism M for the ink ribbon 11, Figures 2 and 5, which passes under type wheels 12, Figures 4, 8 and 9, by which the customer's identifying number is printed on the tag. The cam 7 operates the tape feeding mechanism, and the cam 8 controls the energization of the motor or solenoid 2 for effecting the printing. The cam 9 effects the operation of the motor 3 for the stapling and severing mechanism. The motor 1 has a starting circuit 13 which is closed by a manually operated switch 14 and also a sustaining circuit 15 having a switch 18 in multiple with the switch 14 and controlled by the cam 7 and the motors 2 and 3, which are solenoids in circuits 16 and 17 respectively, the circuit 16 having a switch 19 therein controlled by the cam 8, and the circuit 17 for the third motor having a switch 20 therein closed and opened by the cam 9.

Figures 5, 6, 7:
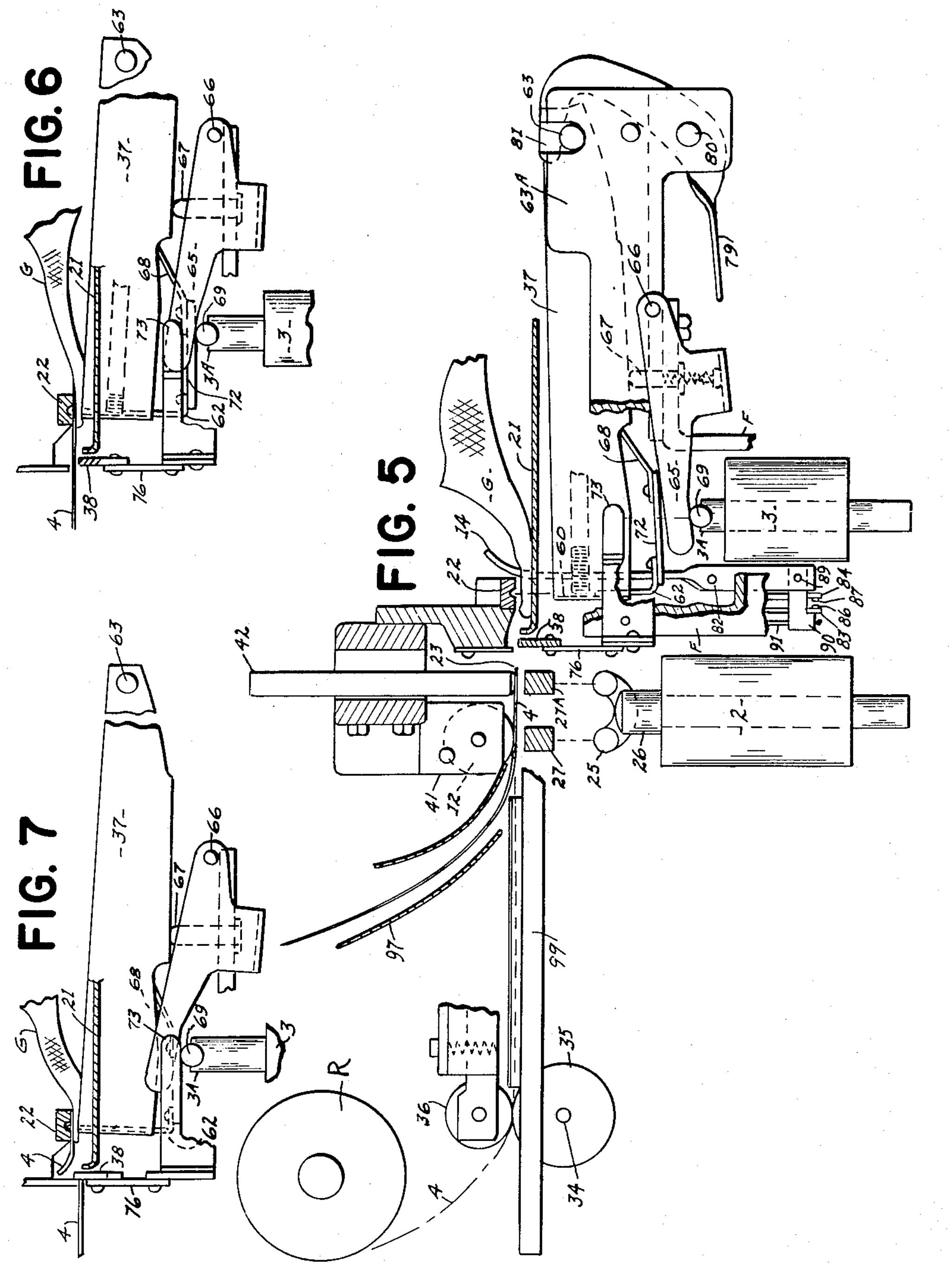
Figure 5 is a side elevation showing in detail the stapling mechanism and its relation to the garment, the stapling mechanism being shown, in starting position.
Figure 6 is a fragmentary elevation showing the stapling mechanism when brought in juxtaposition to the garment and the tag.
Figure 7 is a view, similar to Figure 6, showing the stapling mechanism when in its final operating position.
Figure 11:
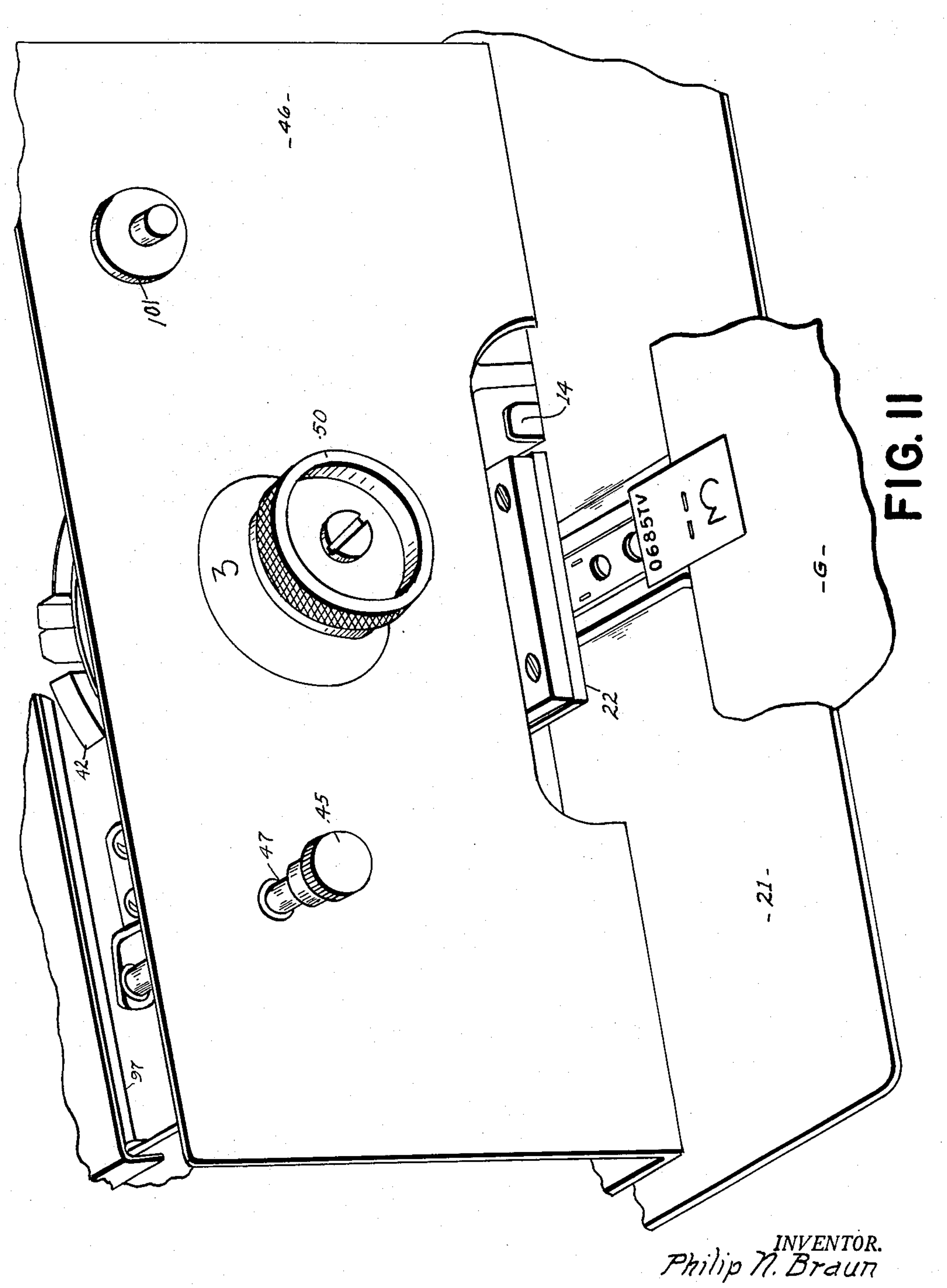
Figure 11 is a partial front elevation of the machine.

The garment G is placed with a margin thereof on a table 21, Figures 2, 5 and 11, having a slot therein in which the stapling mechanism is located, the table 21 also carrying the anvil 22 of the stapling mechanism. The end of the tape 4, when in starting position, terminates at 23, Figure 5, and when the operator places the garment on the table, he closes a manually operable switch 14 in the starting circuit 13 of the master motor so that the master motor starts turning the cam shaft 5 and the cam 7 turns to bring a depression 24, Figure 1, therein into position to permit the switch 18 to close and hold closed the sustaining circuit 15 so that the motor continues its operation and holds the sustaining circuit 15 closed during each cycle of operation. The cam 8 has a single high point which momentarily closes the switch 19 for the solenoid 2. The solenoid 2, when energized, moves a head 25 at the upper end of its reciprocating driven member or core 26, Figure 5, to thrust against platen blocks 27, 27A, of the printing mechanism which lifts the platen blocks 27, 27A, against the tape 4 and presses the tape against the type wheels and the interposed ink ribbon. Thereafter, as the master motor turns, pins 28 on the cam 7 come in contact with radial arms 29 on a star wheel 30 to actuate the tape feeding mechanism.

As here shown, the tape feeding mechanism includes a pair of pins 28 on the cam 7, the star wheel 30 with which the pins mesh, a shaft 31 on which the star wheel is mounted, gears 32, 33, on the shaft 31 and on a shaft 34, respectively, parallel thereto, and a feed roller 35 on the shaft 34 and contacting the under side of the tape 4 to press the tape 4 against a compression roller 36 and thus feed the tape to carry the printed end thereof into stapling and severing position in which a portion of the tag overlies the garment G, Figures 6 and 11, on the table 21. When the tape reaches this position, the cam 9 closes the switch 20 momentarily energizing the third motor 3, the cam 9 having a single high point so that the switch 20 is but momentarily closed. The driven member 3A of the solenoid 3 operates to successively lift the body 37 of the stapling mechanism upward from the position shown in Figures 5 and 8 into the position shown in Figure 6 against the under side of the garment G and thereafter operates the plunger or staple ejector of the stapling mechanism to press the staple through the garment against the anvil 22 so as to clinch over the ends of the staple and at the same time and through mechanism to be described, operates a knife 38 to cut off the printed or tag end of the tape.

Figure 8:
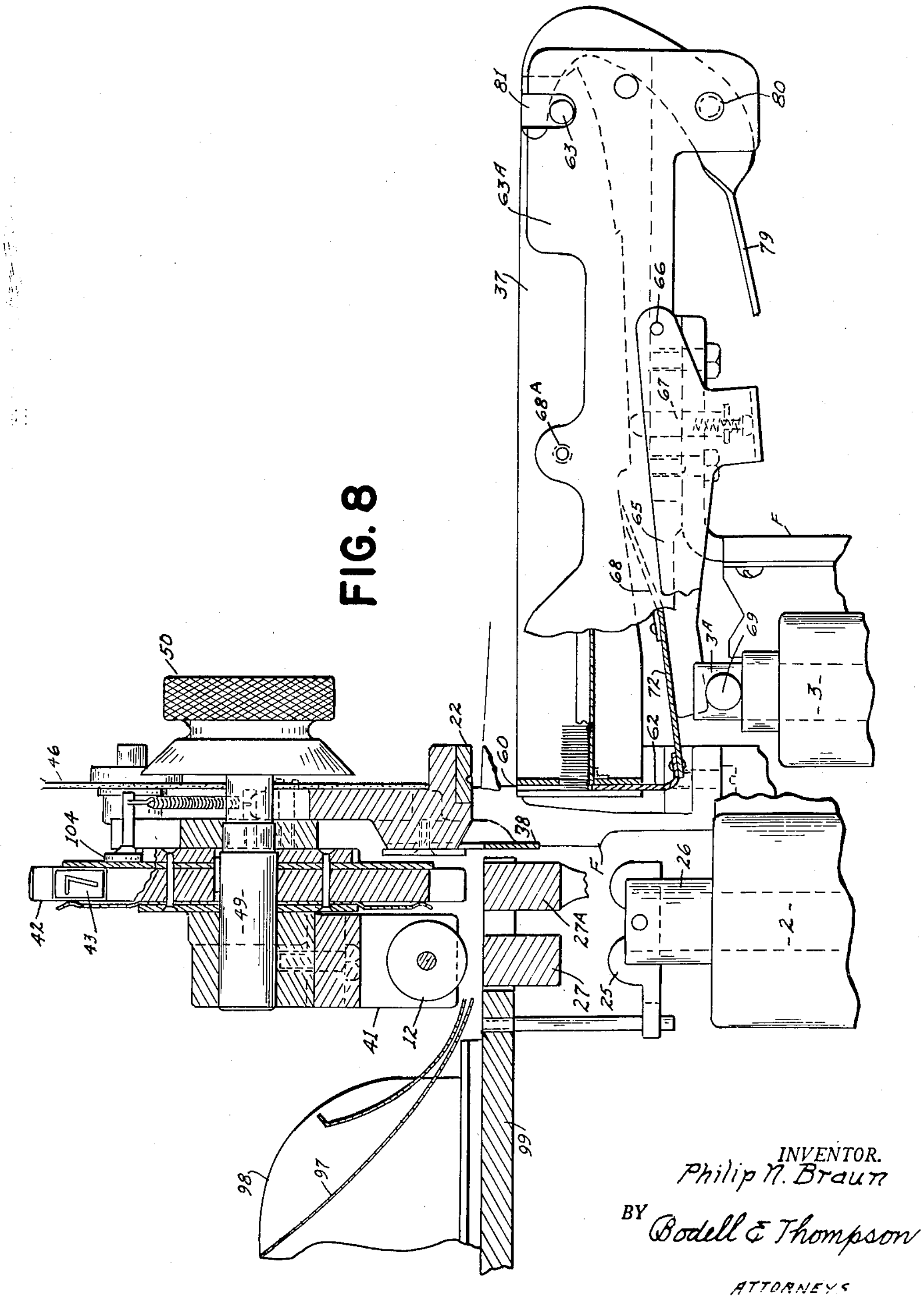
Figure 8 is an enlarged fragmentary end elevation of the stapling mechanism, partly in section, showing the contiguous portion of the printing mechanism and tape severing knife in section.
Figure 10:
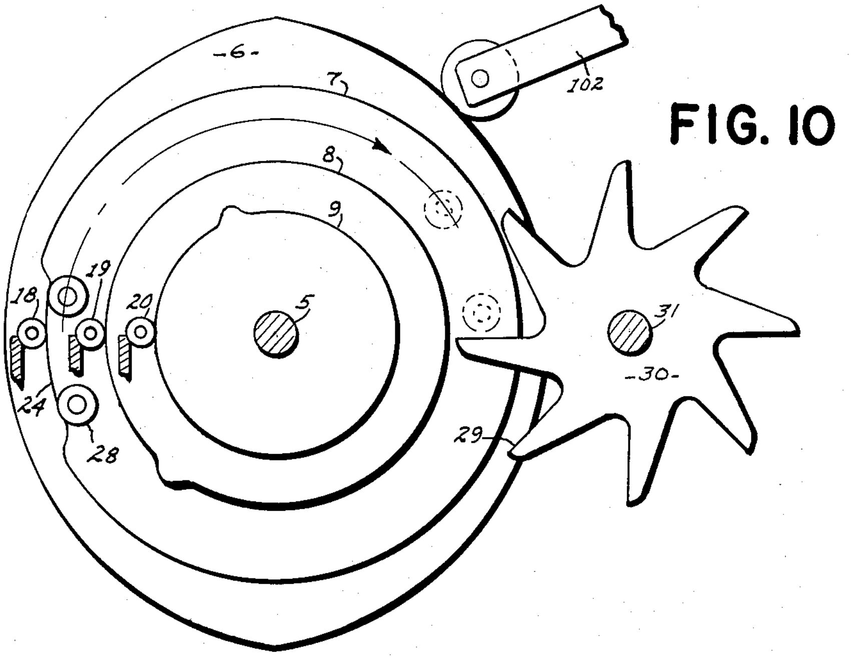
Figure 10 is a detail view of the cam mechanism for operating and timing the printing mechanism and the stapling and severing mechanism, and also the feeding mechanism for the tape.
Figure 9:
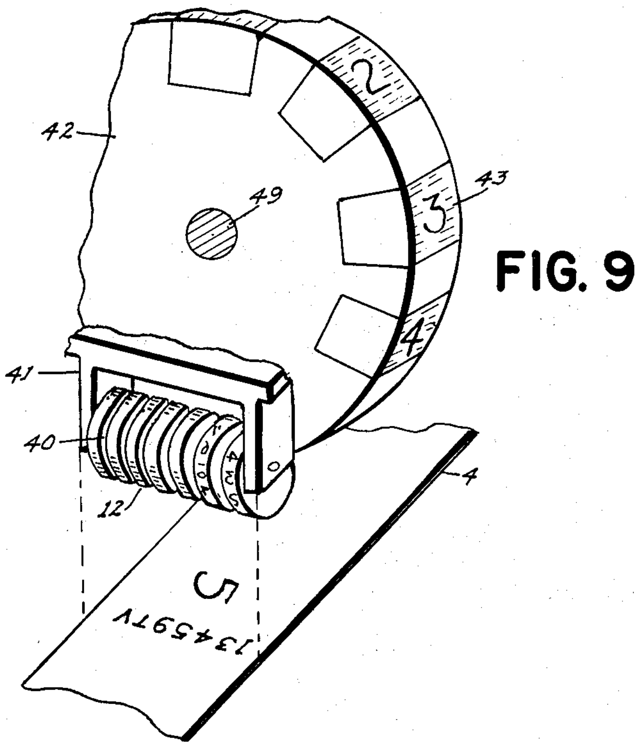
Figure 9 is an isometric view of the printing wheels for printing the customer's identifying number on the tape, and also a manually operable printing wheel for printing another identifying character on the tape.

The printing mechanism comprises the series of type wheels 12 mounted in a suitable carriage 41, Figures 8 and 9, and also a second type wheel 42 carrying self-inking type 43, the type wheels 12 being located with their printing line opposed to the ink ribbon 11 in the path of the platen block 27 against which the head or driven member of the solenoid 2 presses when the solenoid 2 is energized. The type wheels 12 are indexed or advanced by a manually operated mechanism including a push button plunger 45, Figures 4 and 11, carried by the face plate 46 of the machine, and operates through a plunger 47, Figure 4, and a lever 48 pivoted to the frame 41 and coacting with suitable ratchet mechanism also carried by the frame 41 so that when the push button is actuated, it advances the type wheels 12 one step to carry type to print one higher number than the preceding number to the printing line, the numbers printed by the type wheels being those assigned to the individual customer. Each garment of the same customer has applied thereto a tag containing the same identifying number. The type wheel 42 is mounted on a shaft 49 mounted in the face plate 46 and manually turnable to bring a different type to the printing line by means of a knob 50. These type are self-inking and consist of porous wood blocks capable of absorbing ink and expelling it through the face thereof under the slight compressing force which is applied thereto during the printing operation. The blocks are usually of balsa wood and mounted in sockets in the type wheel 42 with their faces flush with the surface of the wheel. The numbers may be embossed on or routed out of the wood blocks.

In use, the wood type prints characters in different colors on the tape, as colors and characters for the days of the week, as red for Monday, green for Tuesday, etc. The different colors of these type when printed on the tags or invoices, as will be described, may indicate the day the article is promised for delivery. Also, the identifying system may comprise the use of tapes 4 of different colors for different days of the week. The color of the tape indicates the day the article was received. Thus, a tag when printed indicates the customer's number, the day the article is promised for delivery, and the day the article is received.

The machine is extremely rapid in operation and, for the purpose of quick identification of the articles of each customer, a different colored tape may be installed each day, the colors of the tape indicating different days of the week, as natural, or white, for Monday, orange for Tuesday, green for Wednesday, yellow for Thursday, pink for Friday, and red for Saturday, these colors indicating the days of the week when the articles of customers were received, and also the type 43 of the type wheel 42 may contain different colored ink, as red for Monday, black for Tuesday, orange for Wednesday, blue for Thursday, green for Friday, and yellow for Saturday, these colors being printed on the tags to indicate the day delivery of the article is promised. This number may be printed in black, but for ease and speed of identification the numbers are in colors, and this type wheel is readily set to print the proper date of delivery on the tag by turning the knob 50. Also, in the event the articles are collected from different sub-stations and taken to a common cleaning plant, one of the sets of type wheels, here shown as the set 40 which prints the customer's identifying number, also carries a station identifying character along with the number, as TV, Figure 9, which indicates the Taylor View Street sub or collecting station. Thus, the printed tag contains the customer's identifying number, as in black, and also a number or a color indicating the date of delivery applied by the type wheel 42, and the color of the tape which may be changed each day indicates the date the article was received for processing. The color of the tape is always different from the color printed to indicate the day the delivery is promised. This constitutes a quickly distinguishable identification scheme particularly useful in a machine where the tags are printed and applied very quickly.

The body 37 of the stapling mechanism holds a magazine for a supply of staples which are fed by a suitable spring pressed follower, not shown, into alinement with the outlet opening 60, Figure 5, alined with the anvil 22, and also with a push plunger or ejector 62, Figures 4, 5, 6 and 8, located to push the staples alined with the anvil through the garment and the tag. The construction of the stapler per se forms no part of this invention as the stapler is of the conventional standard type but the operation of the stapler is a feature of the invention.

The body 37 is demountably pivoted at 63 in a channel shaped casing 63A, Figures 1, 3, 5 and 8, carried by the main frame F and movable upwardly on its pivot to shift the body 37 against the under side of the garment G, or toward the anvil, Figure 6. The driven member or core 3A of the solenoid 3 is located to move upwardly when the solenoid 3 is energized and shift the body 37 against the under side of the garment G on the table 21. The driven member 3A coacts or thrusts against a lever 65 pivoted at 66 to the casing 63A. The lever 65, Figures 1, 3, 5, 6, 7 and 8, carries yieldingly mounted or spring pressed plungers 67 which transfer the motion of the lever 65 to the pivoted body 37 so that when the lever 65 is first actuated, the body 37 is lifted upward and yieldingly pressed by the plungers 67. Thereafter, the lever 65 contacts a resilient arm 68, Figures 5, 6, 7 and 8, anchored at 68A to the casing 63A and rigid with the staple ejector 62, and moves the resilient arm 68 upward and the ejector 62 therewith to shift the staple through the garment and against the anvil. Immediately after the stapling and severing operations, the pins 28 of the cam 7 coact with the star wheel 30 to actuate the shaft 31, and through the gearing 32, 33, actuate the tape feed roller 35, and thus feed the tape so that the end portion thereof comes in juxtaposition to the printing mechanism.

Figure 3:
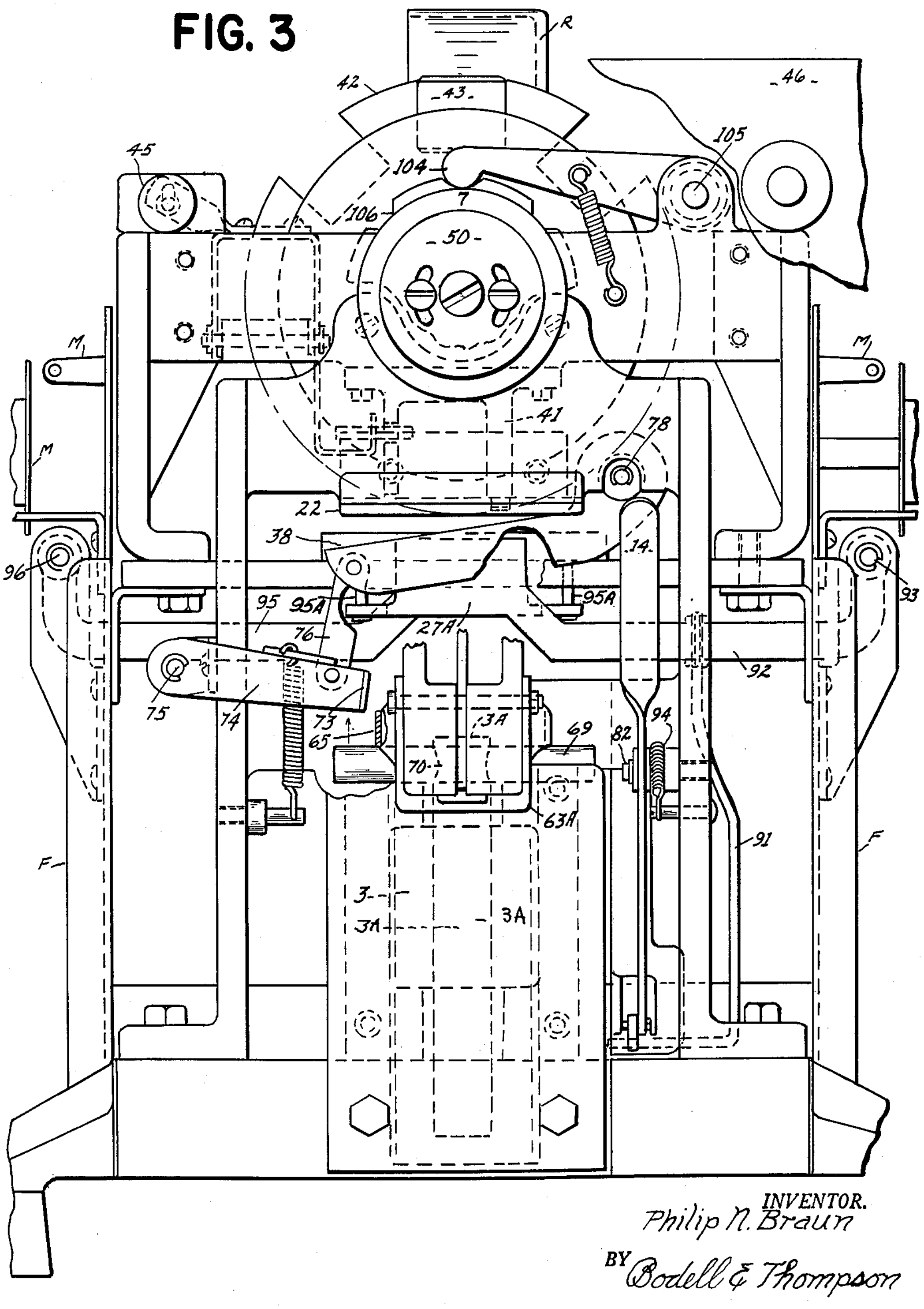
Figure 3 is an enlarged fragmentary front elevational view looking to the left, Figure 2.

As best seen in Figure 3, the head of the driven member or core 3A of the solenoid 3 comprises a transverse rod 69 extending through a bearing 70 at the upper end of the core 3A, the ends of the rod extending laterally beyond the sides of the channel shaped casing 63A. The solenoid 3, when energized, engages the ends of the transverse rod 69 with the lever 65 and moves the lever 65 upward about its pivot and through the plungers 67 lifts the body 37 against the garment. Thereafter, the bearing 70 in the upper end of the driven member or core 3A of the solenoid 3 presses against the bottom of the resilient arm 72 and presses the staple ejector 62 upward to shift the staple in line with the outlet 60 through the garment against the anvil 22. At about the same time, one of the ends of the transverse rod or head 69 of the core 3A engages an angular extension 73, Figures 1 and 3, of a lever 74 pivoted at 75 to the frame and through a link 76 transfers the motion to the knife 38 which is a lever pivoted at 78 to the frame so that immediately after the operation of the ejector, the knife is actuated to sever the tag from the tape. The lever 65 is bifurcated, as seen in Figure 3, and extends on opposite sides of the channel shaped casing 63A to which the body 37 is pivoted, the casing extending forwardly from the main frame of the machine. The body 37 is demountable from the channel shaped casing 63A, it being held in position by a latch lever 79 pivoted at 80 to the casing 63A and having a hook-shaped end overlying the pivot for the body 37, which pivot is located in an upwardly extending open ended slot 81.

The manually operated starting switch 14 is an upright lever pivoted at 82 at its lower end to the frame, Figure 3, the upper end thereof extending above the table 21 in position to be conveniently pressed by the hand holding the garment taut under the anvil 22, or by the pressure of the garment held by the hands in stapling position, and two contact spring arms 83, 84, Figure 1A, secured to a block 85 of insulation at their upper ends and having two contacts 86, 87, at their lower ends, the lever having a latch 88 pivoted at 89 thereto at its lower end below the pivot 82, this latch extending through slots in the springs 83, 84, and having a nose 90 at its end which normally latches over the portion of the spring arm 83 below the slot therein, the contact arms 83, 84, being connected in the starting circuit 13. The latch 88 is lifted upward to unlatch it from the spring arm 83 by a link 91 extending upward and connected to an arm 92 which is pivoted to the frame at 93, this arm carrying one of the platen blocks 27A, the link operating to unlatch the latch 88, permitting the nose of the latch to ride part way through the slot and hence permitting the contacts 84, 86, 87, to separate. As the arm 92 is actuated during each operation of the printing mechanism, the switch arms 83, 84, are opened immediately after the operation of the solenoid 2 and the arm 92 drops, permitting the latch to move into its normal latched position. The switch lever 14 is acted upon by a returning spring 94. Thus, in operation when the switch lever 14 is moved into engaged position about the pivot 82, the latch 88 will be moved rearwardly, or to the right, Figure 1, compressing and flexing the spring ams 83, 84, to engage the contacts 86, 87, so that the starting circuit 13 of the master motor 1 is closed. When the solenoid 2 is energized to operate the printing mechanism, the arm 92 is moved upward and through the link 91 unlatches the latch, and the spring 84 reacts to return the switch arm 14 to its starting position. The master motor is deenergized at the end of its cycle of movement by the depression of the cam 7 registering with the switch 18. When the latch 88 is unlatched and the contact arms 83, 84, separate, the end surface of the nose 90 rides on the end wall of the slot in the contact arm 83, as seen in Figure 1A. The platen block 27 is also carried by a similar lever 95 pivoted at 96 to the main frame, both levers being guided at their ends along guide rods 95A.

For the purpose of printing on record sheets, as invoices or lists of goods, a record sheet guide 97, Figures 5 and 8, is provided, this being arranged to guide the record sheet beneath the printing wheels over the platen blocks 27, 27A. These guides are supported by side plates 98, Figure 2, arising upwardly from the top plate 99 of the frame of the machine. For the purpose of printing on record sheets, as invoices, the motor 2 can be energized independently of the other motors to print on the invoice. The circuit individual to the motor 2 is controlled by a push button switch 101 on the face plate 46 of the machine. The circuit is shown by the wire 16A in multiple with the circuit 16.

The ink ribbon mechanism per se forms no part of this invention. It is controlled by the cam 6 through the lever 102 coacting with the cam 6. The lever 102 also has an arm 103 carried thereby which supports the shaft 34 on which the feed roller 35 of the tape feeding mechanism is mounted. When the lever 102 is actuated by the cam 6, to feed the ribbon 11, the lever applied an upward pressure on the shaft 34 to engage the tape 4 between the tape feed roller 35 and roller 36 whereby the ink ribbon and the tape are fed simultaneously.

The type wheel 42 is indexed by turning its knob 50 and is held in its indexed position by a spring pressed latch 104, Figure 3, pivoted at 105, coacting with cam shaped notches 106 in the periphery of the shank of the knob 50.

In the general operation, the operator sets the type wheels to the desired numbers at the printing line and places a garment on the table 21 with the margin thereof under the anvil and draws the margin taut and then, either with the garment or with a finger of the hand grasping the garment, closes the switch 14, starting the master motor 1. The master motor then goes through its cycle of movement operating the solenoid 2 for the printing mechanism and the tape feeding mechanism successively, and then operating the solenoid 3 of the stapling and tag severing mechanism. During the printing operation, the printing platen forcibly opens the starting circuit 13. Thus, by this machine tags are quickly printed and applied to a garment in one cycle of operation.

What I claim is:

1. A machine of the class described comprising a frame, tape printing, feeding and tag stapling and severing mechanism carried by the frame, and actuating and timing mechanisms therefor comprising a timer shaft and means operated by said shaft to operate the printing, tape feeding and the tag stapling and severing mechanisms consecutively, the actuating mechanism comprising a master rotary motor to which the timer shaft is connected to be actuated thereby, and second and third motors for actuating the printing and the tag stapling and severing mechanisms respectively, a starting circuit for the master motor having a manually closeable switch therein, a sustaining circuit for the master motor in multiple with the starting circuit, separate circuits for the second and third motors, the timer comprising cams, one operating to close and hold closed a switch in the sustaining circuit, and a second cam operating to close and open a switch in the circuit of the second motor, and a third cam to momentarily close and open a switch in the circuit for the third motor successive to the opening and closing of the switch in the circuit for the second motor, the timer also having means for actuating the tape feeding mechanism successively to the operation of the printing mechanism by the second motor.

2. A machine of the class described comprising a frame, tape printing, feeding and tag stapling and severing mechanism carried by the frame, and actuating and timing mechanisms therefor comprising a timer shaft and means operated by said shaft to operate the printing, tape feeding and the tag stapling and severing mechanisms consecutively, the actuating mechanism comprising a master rotary motor to which the timer shaft is connected to be actuated thereby, and second and third motors for actuating the printing and the tag stapling and severing mechanisms respectively, a starting circuit for the master motor having a manually closeable switch therein, a sustaining circuit for the master motor in multiple with the starting circuit, separate circuits for the second and third motors, the timer comprising cams, one operating to close and hold closed a switch in the sustaining circuit, and a second cam operating to close and open a switch in the circuit of the second motor, and a third cam to momentarily close and open a switch in the circuit for the third motor successive to the opening and closing of the switch in the circuit for the second motor, the timer also having means for actuating the tape feeding mechanism successively to the operation of the printing mechanism by the second motor, and means operated by one of the motors to open the starting switch before the cam controlling the switch in the sustaining circuit completes its cycle of movement.

3. A machine of the class described comprising a frame, tape printing, feeding, tag stapling and severing mechanisms, and actuating and timing mechanism therefor carried by the frame, the actuating and timing mechanism comprising a rotary master motor, first and second magnetically operated single impulse motors having reciprocating driven members for operating the printing and the stapling and severing mechanisms respectively, one for the printing mechanism, and one for the stapling and severing mechanisms, the printing mechanism including a movable platen operated by the second motor, circuits for said motors having switches therein, and a cam shaft connected to the shaft of the master motor and having cams shaped and located to close and open the switches respectively to close and hold closed the switch in the master motor circuit during the operating cycle, and to close the switches in the circuits for the second and third motors successively and momentarily during each cycle of movement of the master motor.

4. A machine of the class described comprising a frame, tape printing, feeding, tag stapling and severing mechanisms, and actuating and timing mechanism therefor carried by the frame, the actuating and timing mechanism comprising a rotary master motor, first and second magnetically operated single impulse motors having reciprocating driven members for operating the printing and the stapling and severing mechanisms respectively, one for the printing mechanism, and one for the stapling and severing mechanisms, the printing mechanism including a movable platen operated by the second motor, circuits for said motors having switches therein, and a cam shaft connected to the shaft of the master motor and having cams shaped and located to close and open the switches respectively to close and hold closed the switch in the master motor circuit during the operating cycle, and to close the switches in the circuits for the second and third motors successively and momentarily during each cycle of movement of the master motor, there being a starting circuit for the master motor having a manually closeable switch therein, and connections between the platen of the printing mechanism and the switch in the starting circuit to open the starting circuit after each printing operation.

5. A machine of the class described comprising a frame, tape printing, feeding, tag stapling and severing mechanisms, and actuating and timing mechanism therefor carried by the frame, the actuating and timing mechanism comprising a rotary master motor, first and second magnetically operated single impulse motors having reciprocating driven members for operating the printing and the stapling and severing mechanisms respectively, one for the printing mechanism, and one for the stapling and severing mechanisms, the printing mechanism including a movable platen operated by the second motor, circuits for said motors having switches therein, and a cam shaft connected to the shaft of the master motor and having cams shaped and located to close and open the switches respectively to close and hold closed the switch in the master motor circuit during the operating cycle, and to close the switches in the circuits for the second and third motors successively and momentarily during each cycle of movement of the master motor, the second motor being connected in a circuit individual thereto and having a normally openable, manually operable switch therein to energize the second motor independently of the other motors.

6. A machine of the class described comprising a frame, tape printing, feeding, tag stapling and severing mechanisms, and actuating and timing mechanism therefor carried by the frame, the actuating and timing mechanism comprising a rotary master motor, first and second magnetically operated single impulse motors having reciprocating driven members for operating the printing and the stapling and severing mechanisms respectively, one for the printing mechanism, and one for the stapling and severing mechanisms, the printing mechanism including a movable platen operated by the second motor, circuits for said motors having switches therein, and a cam shaft connected to the shaft of the master motor and having cams shaped and located to close and open the switches respectively to close and hold closed the switch in the master motor circuit during the operating cycle, and to close the switches in the circuits for the second and third motors successively and momentarily during each cycle of movement of the master motor, a guide for a record sheet carried by the frame and located to guide the sheet into position to cover the platen and the portion of the tape at the printing line, a circuit individual to the second motor and havng a normally open, self operable, manually closeable switch therein.

7. A machine of the class described comprising tape printing, feeding, tag stapling and tag severing mechanisms and actuating and timing mechanisms therefor, the printing mechanism having a movable platen over which the tape is fed, the stapling mechanism including a movable body for holding a supply of staples and feeding them one by one to stapling position, and an anvil arranged to receive the printed end of the tape from the printing mechanism and also the work to which the printed end is to be stapled, the severing mechanism including a knife movable between the printing mechanism and the stapling mechanism, the actuating and timing mechanism comprising a master motor, a second motor having a driven part for actuating the platen, and the third motor having a driven part for shifting the body of the stapling mechanism against the work andshifting the body of the stapling mechanism to the work against the anvil, and for operating the knife during each operation of the stapling mechanism, a feed circuit having branch circuits to the motors respectively having switches therein, and a starting circuit for the master motor having a manual switch therein, the actuating and timing mechanism being characterized by a cam shaft actuated by the master motor and having cams to successively close the switches in the branch circuits for the master motor, close and open the switch in the feed circuit branch to the second motor, actuate the tape feeding mechanism to feed the tape one tag length, close and open the switch in the branch of the third motor and open the switch in the feed circuit branch to the master motor.

8. A machine of the class described comprising tape printing, feeding, tag stapling and tag severing mechanisms and actuating and timing mechanisms therefor, the printing mechanism having a movable platen over which the tape is fed, the stapling mechanism including a movable body for holding a supply of staples and feeding them one by one to stapling position, and an anvil arranged to receive the printed end of the tape from the printing mechanism and also the work to which the printed end is to be stapled, the severing mechanism including a knife movable between the printing mechanism and the stapling mechanism, the actuating and timing mechanism comprising a master motor, a second motor having a driven part for actuating the platen, and the third motor having a driven part for shifting the body of the stapling mechanism against the work and shifting the body of the stapling mechanism to the work against the anvil, and for operating the knife during each operation of the stapling mechanism, a feed circuit having branch circuits to the motors respectively having switches therein, and a starting circuit for the master motor having a manual switch therein, the actuating and timing mechanism being characterized by a cam shaft actuated by the master motor and having cams to successively close the switches in the branch circuits for the master motor, close and open the switch in the feed circuit branch to the second motor, actuate the tape feeding mechanism to feed the tape one tag length, close and open the switch in the branch of the third motor and open the switch in the feed circuit branch to the master motor, the starting switch having means for holding it in closed position, and the switch in the starting circuit connected to the platen to be opened by the operating movement of the platen.

References Cited in the file of this patent

UNITED STATES PATENTS

| | | |
|---|---|---|
| Re. 22,118 | Lohrey | June 16, 1942 |
| 443,960 | Gibbs | Dec. 30, 1890 |
| 1,125,696 | Craig | Jan. 26, 1915 |
| 1,503,745 | Clauss | Aug. 5, 1924 |
| 1,807,170 | Peterson | May 26, 1931 |
| 1,969,898 | Mortimer | Aug. 14, 1934 |
| 2,083,150 | Flood | June 8, 1937 |
| 2,088,350 | Shanks et al. | July 27, 1937 |
| 2,103,654 | Weimont et al. | Dec. 28, 1937 |
| 2,160,552 | Maiben | May 30, 1939 |
| 2,239,060 | Sloan | Apr. 22, 1941 |
| 2,403,947 | Oussani | July 16, 1946 |
| 2,449,188 | Weller | Sept. 14, 1948 |
| 2,474,843 | Helsing | July 5, 1949 |
| 2,528,740 | Carothers et al. | Nov. 7, 1950 |
| 2,551,985 | Weller | May 8, 1951 |
| 2,567,969 | Salit et al. | Sept. 18, 1951 |
| 2,582,731 | Young | Jan. 15, 1952 |
| 2,638,822 | Mackechnie | May 19, 1953 |